(12) United States Patent
Kawarai

(10) Patent No.: US 7,046,930 B2
(45) Date of Patent: May 16, 2006

(54) OPTICAL COMMUNICATION SYSTEM

(75) Inventor: Masashige Kawarai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 10/733,128

(22) Filed: Dec. 11, 2003

(65) Prior Publication Data

US 2004/0247314 A1    Dec. 9, 2004

Related U.S. Application Data

(63) Continuation of application No. PCT/JP01/05042, filed on Jun. 13, 2001.

(51) Int. Cl.
*H04B 10/08* (2006.01)
*H04B 17/00* (2006.01)
*H04J 14/00* (2006.01)

(52) U.S. Cl. .......................... 398/27; 398/69
(58) Field of Classification Search ................ 398/27, 398/25, 33, 34, 195, 196, 197, 69
See application file for complete search history.

(56) References Cited

U.S. PATENT DOCUMENTS

| | | | |
|---|---|---|---|
| 4,893,300 A * | 1/1990 | Carlin et al. ................. | 398/76 |
| 6,115,157 A * | 9/2000 | Barnard et al. ............... | 398/1 |
| 6,148,423 A | 11/2000 | Le Mouel et al. | |
| 6,859,623 B1 * | 2/2005 | Le Bouette et al. .......... | 398/94 |
| 2002/0181042 A1 * | 12/2002 | Graves et al. ............... | 359/124 |

FOREIGN PATENT DOCUMENTS

| | | |
|---|---|---|
| EP | 0 580 497 | 1/1994 |
| JP | 55-105453 | 8/1980 |
| JP | 56-100540 | 8/1981 |
| JP | 04-115737 | 4/1992 |
| JP | 06-204986 | 7/1994 |
| JP | 08-088623 | 4/1996 |
| JP | 11-177648 | 7/1999 |
| JP | 2000-341296 | 12/2000 |

* cited by examiner

*Primary Examiner*—Jason Chan
*Assistant Examiner*—Quan-Zhen Wang
(74) *Attorney, Agent, or Firm*—Katten Muchin Zavis Rosenman LLP

(57) ABSTRACT

A communication system capable of performing efficient Wavelength Division Multiplexing (WDM) transmission by flexibly handling connection services. A Bit Error Rate (BER) measurement unit measures BER of individual optical signals with different wavelengths. A BER transmission unit transmits BER information to the sending end. A wavelength assignment unit assigns each wavelength to at least one of high Quality-of-Service (QoS) communication and low QoS communication. A wavelength-assignment exchanging unit identifies low quality wavelengths with high BERs being used for the high QoS communication, and unless the low quality wavelengths being used for the high QoS communication outnumber the high quality wavelengths with low BERs being used for the low QoS communication, it exchanges the low quality wavelengths and an equal number of the high quality wavelengths. An optical signal transmission unit multiplexes the wavelengths to transmit the optical signals.

10 Claims, 8 Drawing Sheets

OPTICAL COMMUNICATION SYSTEM

This application is a continuing application, filed under 35 U.S.C. §111(a), of International Application PCT/JP01/05042, filed Jun. 13, 2001.

BACKGROUND OF THE INVENTION (1) Field of the Invention

This invention relates to an optical communication system and more particularly, to an optical communication system for wavelength division multiplexing (WDM) optical communication.

(2) Description of the Related Art

In recent years Asynchronous Transfer Mode (ATM) networks have been rapidly developed with increasing needs for communication services including the Internet. The ATM is suitable for multimedia communication, with a guarantee of a defined level of Quality of Service (QoS), as well as providing high-speed and wide-bandwidth connections.

Further, WDM optical transmission techniques are widely adopted, which multiplex many signals using different optical wavelengths for simultaneous transmission over a single optical fiber.

The ATM network providing an ATM communication service with such WDM optical transmission techniques is desired to provide more sophisticated services and a higher quality of service for multimedia applications.

The WDM systems achieve long-distance and large-capacity transmission with many optical repeater amplifiers provided on a transmission line. But on the other hand, as an inevitable problem in optical transmission, non-flat wavelength response of optical repeater amplifiers and nonlinear properties of transmission media degrade the signal to noise (S/N) ratio of optical signals being transmitted, depending on their wavelengths. To obtain uniform S/N ratios, optical pre-emphasis is conventionally performed.

The optical pre-emphasis first measures the Bit Error Rate (BER) of an optical signal transmitted via many optical repeater amplifiers. If the result is unsatisfactory, the transmission station performs WDM transmission with an increased power level of the optical signal so that the BER satisfies a prescribed level, typically 10E-15(=$10^{-15}$). However, in this technique, all WDM wavelengths are subject to optical power control, regardless of what ATM connection services they are used for. This increases the cost of the network.

The currently dominant ATM connection services include Unspecified Bit Rate (UBR) service and Continuous Bit Rate (CBR) service, which are different in levels of QoS. The UBR is a best effort type of service in which cells are sent if there is any free bandwidth. The CBR, on the other hand, is a service in which a bandwidth can be kept like a leased line. UBR service is intended for carrying LAN traffic. If the data transfer fails, a relevant user-side protocol (e.g., TCP) is supposed to retry it. Therefore, the UBR service does not necessarily have to keep a BER of as low as 10E-15, but is allowed to operate with a relaxed quality requirement, such as a BER of 10E-11 (=$10^{-11}$).

However, as described above, the conventional technique applies optical pre-emphasis to ensure a high transmission quality for all wavelengths, regardless of what connection services (that is, UBR service and CBR service) they are used for. This is an excessive function, and increases power consumption and network costs. We need to find another solution to realize a more economical ATM network.

SUMMARY OF THE INVENTION

Taking the above into consideration, an object of the present invention is to provide an optical communication system providing efficient wavelength division multiplexing (WDM) transmission by flexibly handling connection services.

To accomplish the above object, according to the present invention, there is provided an optical communication system for WDM optical communication. This optical communication system comprises: (a) an optical reception device comprising: a Bit Error Rate (BER) measurement unit for measuring BERs of individual optical signals with different wavelengths that are received from a sending end, and a BER transmission unit for transmitting BER information back to the sending end; and (b) an optical transmission device disposed at the sending end, comprising: a wavelength assignment unit for assigning each wavelength for optical signals to at least one of high. Quality-of-Service (QoS) communication and low QoS communication, a wavelength-assignment exchanging unit for identifying, based on the BER information, that low quality wavelengths with high BERs are being used for the high QoS communication, and unless the low quality wavelengths being used for the high QoS communication outnumber high quality wavelengths with low BERs being used for the low QoS communication, exchanging the low quality wavelengths and an equal number of the high quality wavelengths, and an optical signal transmission unit for multiplexing the wavelengths to transmit the optical signals.

The Bit Error Rate (BER) measurement unit measures BERs of individual optical signals with different wavelengths that are received from a sending end. The BER transmission unit transmits BER information back to the sending end. The wavelength assignment unit assigns each wavelength for the optical signals to at least one of high Quality-of-Service (QoS) communication and low QoS communication. The wavelength-assignment exchanging unit identifies, based on the BER information, that low quality wavelengths with high BERs are being used for the high QoS communication, and unless the low quality wavelengths being used for the high QoS communication outnumber high quality wavelengths with low BERs being used for the low QoS communication, exchanges the low quality wavelengths and an equal number of the high quality wavelengths. The optical signal transmission unit multiplexes the wavelengths to transmit the optical signals.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
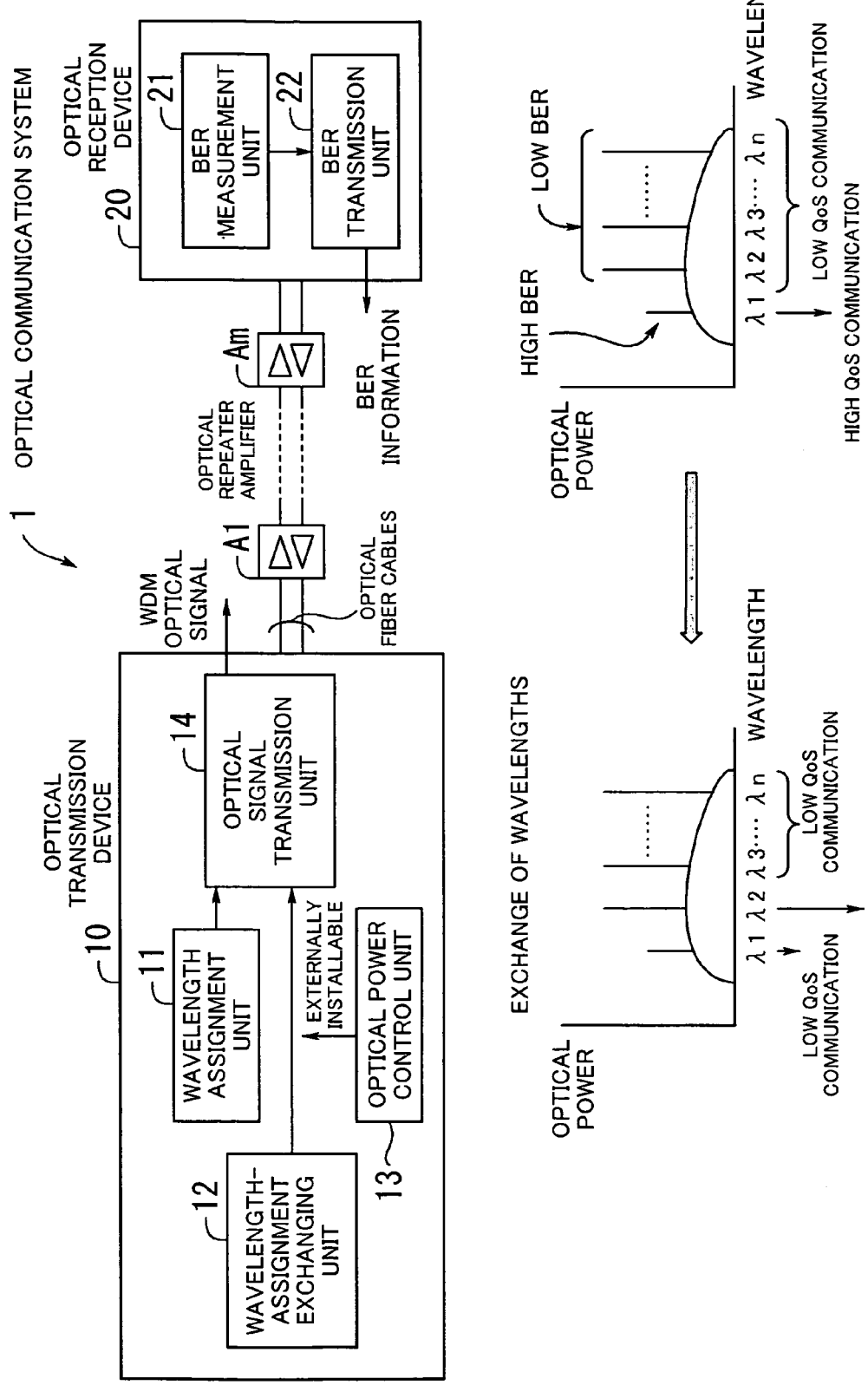
FIG. 1 shows the principle of an optical communication system of the present invention.

FIG. 1 shows the principle of an optical communication system of this invention. This optical communication system 1 is composed of an optical transmission device 10 and an optical reception device 20 and performs Wavelength Division Multiplexing (WDM) optical transmission. The optical transmission device 10 and the optical reception device 20 are connected to each other with optical fiber cables for two-way communications. On the optical fiber cables, optical repeater amplifiers (in-line amplifiers) A1 to Am are provided to amplify and relay optical signals.

A Bit Error Rate (BER) measurement unit 21 of the optical reception device 20 measures the BER (the ratio of the number of errors in a transmission to the number of bits received) of each WDM optical signal received, for all wavelengths $\lambda 1$ to $\lambda n$. Note that some optical signals from the optical transmission device 10 may have degraded S/N ratios due to the uneven wavelength response of the optical repeater amplifiers A1 to Am and nonlinear properties of the optical fiber cable, which means having a high BER. Therefore, the BER measurement unit 21 is capable of detecting transmission quality of each wavelength by measuring its BER.

A BER transmission unit 22 inserts BER information into an optical supervisory signal called Optical Supervisory Channel (OSC) used in WDM systems and transmits the signal back to the optical transmission device 10. A wavelength assignment unit 11 of the optical transmission device 10 assigns each wavelength to at least one of high QoS communication and low QoS communication. A wavelength-assignment exchanging unit 12 exchanges wavelengths, if necessary, based on the BER information transmitted from the optical reception device 20.

Now suppose that the BER information indicates that low quality wavelengths are being used for high QoS communication. In this case, when the number of low quality wavelengths being used for high QoS communication does not exceed the number of high quality wavelengths being used for low QoS communication, the low quality wavelengths and an equal number of the high quality wavelengths are exchanged, so as to assign more appropriate wavelengths to the communication.

A high quality wavelength is a wavelength with a low BER (small S/N degradation) while a low quality wavelength is a wavelength with a high BER. Although low quality wavelengths are not suitable for high QoS communication due to severe S/N degradation, they are sufficient for low QoS communication.

If the wavelength-assignment exchanging unit 12 can not exchange wavelengths, or when BERs are desired to satisfy a prescribed level, an optical power control unit 13 is used to amplify optical power of low quality wavelengths or all wavelengths by optical pre-emphasis (BER can be improved by amplifying optical power). Note that the optical power control unit 13 is a user-installable external unit.

An optical signal transmission unit 14 multiplexes the wavelengths each of which has been assigned to a particular communication service by the wavelength assignment unit 11, the wavelengths exchanged by the wavelength-assignment exchanging unit 12, or the wavelengths amplified by the optical power control unit 13, in order to transmit WDM optical signals over a single optical fiber.

Figure 2:
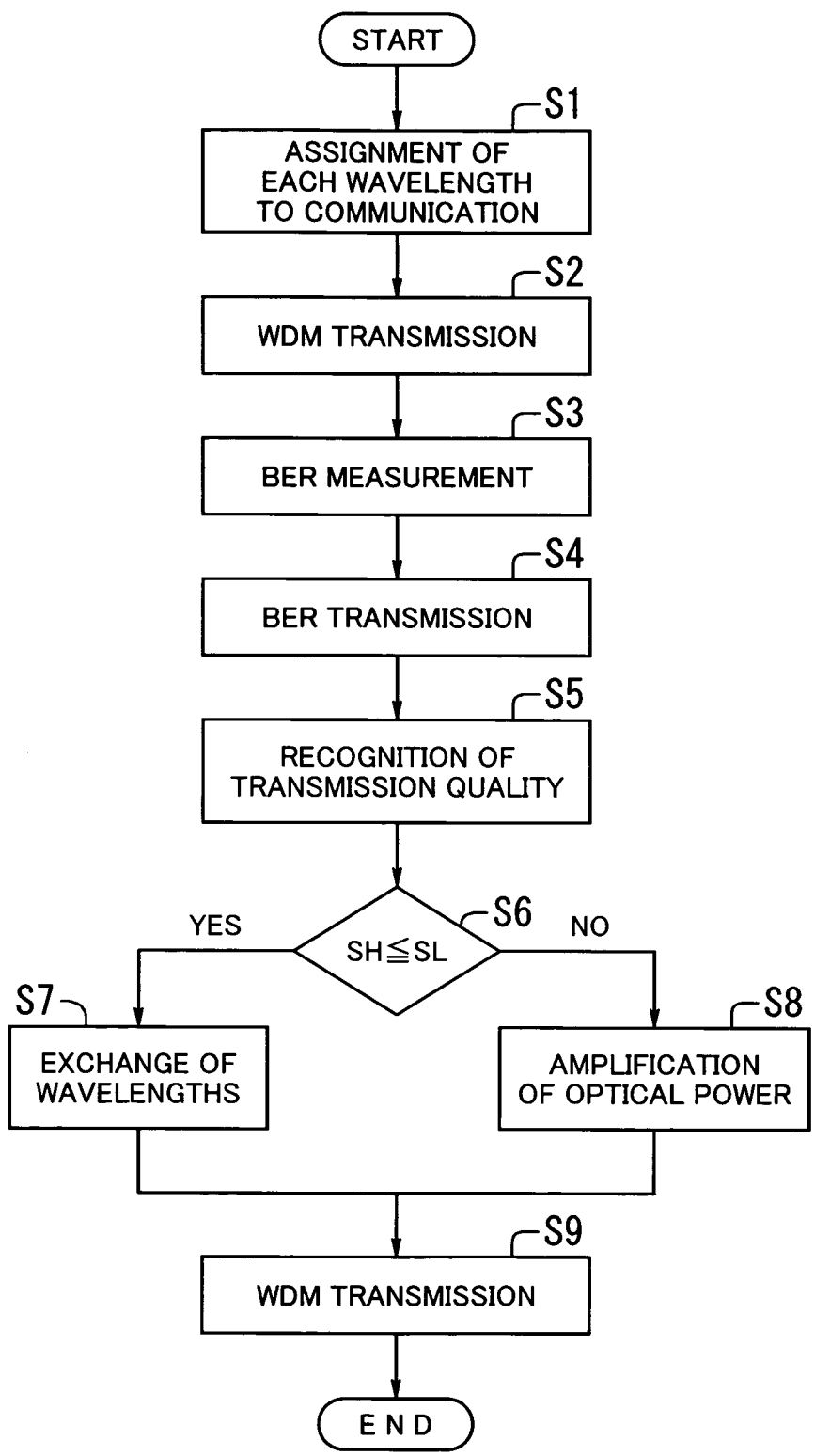
FIG. 2 is a flowchart showing operation of the optical communication system.

Referring to FIG. 1 and FIG. 2, the operation of the optical communication system 1 will be described.

[S1] The wavelength assignment unit 11 assigns each wavelength to a particular communication service. Now suppose that $\lambda 1$ is assigned to high QoS communication and $\lambda 2$ to $\lambda n$ are assigned to low QoS communication.

[S2] The optical signal transmission unit 14 multiplexes the wavelengths $\lambda 1$ to $\lambda n$, to thereby transmit WDM optical signals.

[S3] The BER measurement unit 21 measures BER for each wavelength when receiving the WDM optical signals. In FIG. 1, $\lambda 1$ has a higher BER than the others, and therefore $\lambda 1$ is a low quality wavelength and $\lambda 2$ to $\lambda n$ are high quality wavelengths.

[S4] The BER transmission unit 22 inserts the measurement results in an OSC signal and transmits the resultant signal to the optical transmission device 10.

[S5] The wavelength-assignment exchanging unit 12 recognizes based on the BER information that the low quality wavelength $\lambda 1$ is being used for the high QoS communication.

[S6] The wavelength-assignment exchanging unit 12 compares the number (SH) of low quality wavelengths for the high QoS communication to the number (SL) of high quality wavelengths for the low QoS communication. When SH is not greater than SL (SH$\leq$SL), the process goes to step S7; and to step S8, otherwise (SH>SL).

[S7] The wavelength-assignment exchanging unit 12 exchanges the low quality wavelength $\lambda 1$ and, for example, the high quality wavelength $\lambda 2$ out of $\lambda 2$ to $\lambda n$, thereby reassigning the high quality wavelength $\lambda 2$ to the high QoS communication and the low quality wavelength $\lambda 1$ to the low QoS communication. In this manner, the wavelengths can be exchanged.

[S8] If SH is larger than SL, the wavelengths can not be exchanged. In this case (or when BERs are desired to satisfy a prescribed level), the optical power control unit 13 is used to amplify the optical power of only the low quality wavelength $\lambda 1$ or all wavelengths so that every wavelength satisfies a prescribed BER requirement.

[S9] The optical signal transmission unit 14 multiplexes the wavelengths $\lambda 1$ to $\lambda n$ after the exchange of wavelengths or after the optical power amplification, so as to transmit WDM optical signals.

Figure 3:
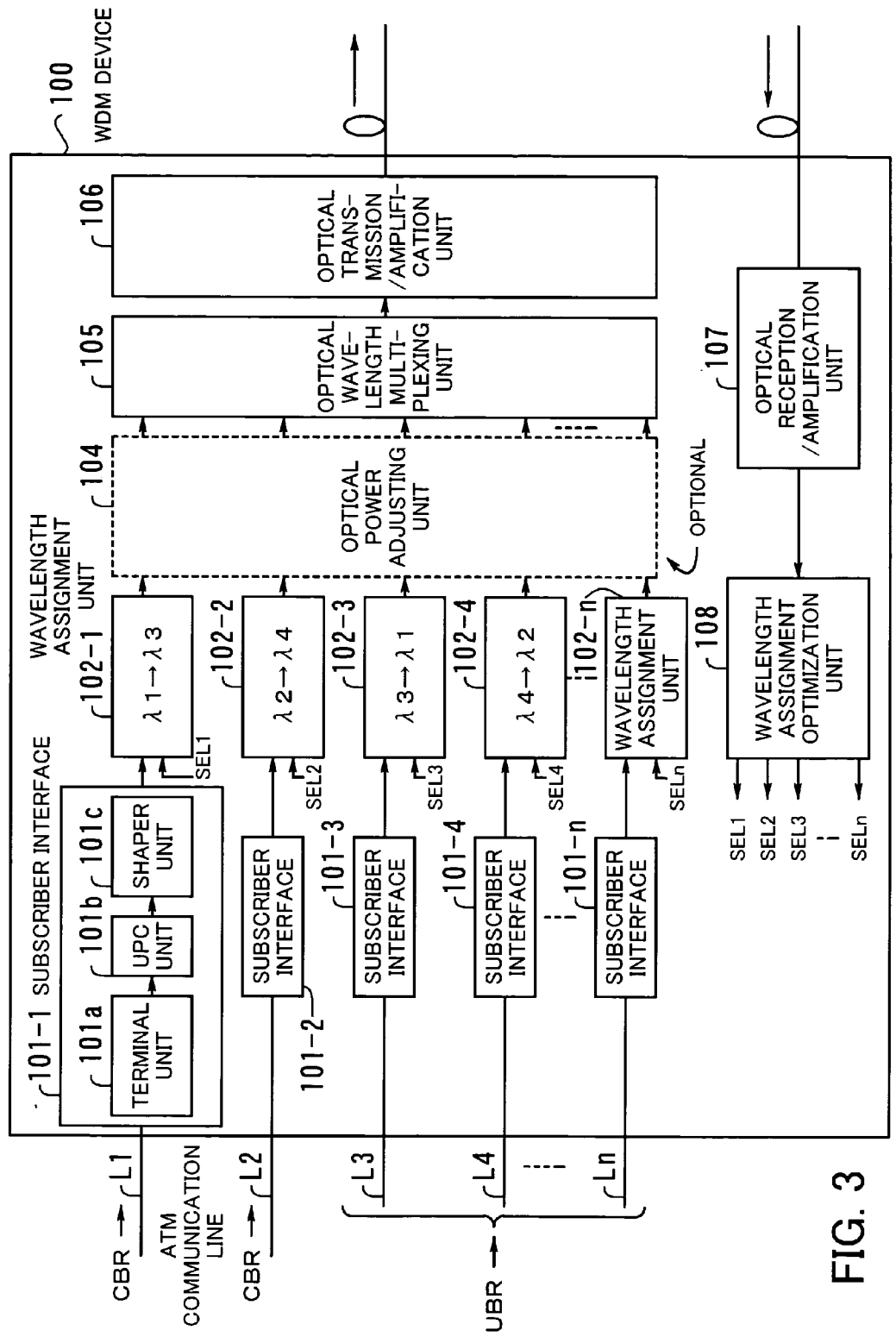
FIG. 3 shows the construction of a WDM device.

Next, a case of applying the optical communication system 1 to a system for providing an ATM communication service with WDM optical transmission will be described in detail. FIG. 3 shows a construction of a WDM device. The WDM device 100 has ATM interfaces to perform WDM transmission and corresponds to the optical transmission device 10. The description of the construction of the reception side of the WDM device corresponding to the optical reception device 20 is omitted, and control based on this invention will be mainly explained in the following description.

The WDM device 100 is connected with ATM communication lines L1 to Ln which are input lines for ATM (output lines are not shown in this figure). Each of subscriber interfaces 101-1 to 101-n receives and processes ATM cells coming from corresponding ATM communication lines L1 to Ln. Now suppose that cells of CBR (bandwidth-guaranteed) service providing high QoS communication are received through the first two ATM communication lines L1 and L2, and cells of UBR (best effort) service providing low QoS communication are received through the other ATM communication lines L3 to Ln.

Each of the subscriber interfaces 101-1 to 101-n is composed of a terminal unit 101a, a User Parameter Control (UPC) unit 101b, and a shaper unit 101c. The terminal unit 101a receives cells. The UPC unit 101b controls the incoming traffic to avoid congestion. The shaper unit 101c limits the bandwidth with traffic shaper control functions to have fixed space between cells.

Wavelength assignment units 102-1 to 102-n are provided on the ATM communication lines L1 to Ln, respectively, to convert received cells into an optical signal through electrical/optical conversion. In this process, these units assign different wavelengths to the lines for WDM transmission at the next stage (for example, dense WDM transmission in a wavelength band around 1550 nm). Now suppose that wavelengths $\lambda 1$ to $\lambda n$ are assigned to the ATM communication lines L1 to Ln, respectively.

The optical signals are directed to optical wavelength multiplexing unit 105 through an optional optical power adjusting unit 104 (described later). The optical wavelength multiplexing unit 105 multiplexes the wavelengths $\lambda 1$ to $\lambda n$ of optical signals supplied from the wavelength assignment unit 102-1 to 102-n to thereby create WDM optical signals. An optical transmission/amplification unit 106 amplifies the WDM optical signals and transmits them over an optical fiber cable.

When the WDM optical signals arrive at the receiving end, the receiving WDM device measures BER for each wavelength. Now suppose that the BERs of $\lambda 1$ and $\lambda 2$ are measured to be 10E-11 and the BERs of $\lambda 3$ to $\lambda n$ are measured to be 10E-15. These measurement results are transmitted back to the sending WDM device 100 via an OSC signal.

An optical reception/amplification unit 107 receives the OSC signal from the remote WDM device at the receiving end. A wavelength assignment optimization unit 108 extracts the BER information from the OSC signal, thus recognizing that the CBR service has a transmission quality of 10E-11 and the UBR service has a transmission quality of 10E-15. Note that the CBR service needs the transmission quality of 10E-15, while the transmission quality of 10E-11 is sufficient for the UBR service. Therefore, their wavelengths are exchanged as follows.

The wavelength assignment optimization unit 108 compares the number (SH) of low quality wavelengths for CBR service to the number (SL) of high quality wavelengths for UBR service. In this example, SH is less than SL. Therefore, the wavelength assignment optimization unit 108 sends switching command signals SEL1 and SEL2 to instruct the wavelength assignment units 102-1 and 102-2 to switch from the low quality wavelengths $\lambda 1$ and $\lambda 2$ to the high quality wavelengths $\lambda 3$ and $\lambda 4$, respectively. In addition, the wavelength assignment optimization unit 108 sends switching command signals SEL3 and SEL4 to instruct the wavelength assignment units 102-3 and 102-4 to switch from the high quality wavelengths $\lambda 3$ and $\lambda 4$ to the low quality wavelengths $\lambda 1$ and $\lambda 2$, respectively.

The wavelength assignment units 102-1 and 102-2 change $\lambda 1$ and $\lambda 2$ to $\lambda 3$ and $\lambda 4$, respectively, which means that the high quality wavelengths $\lambda 3$ and $\lambda 4$ are assigned to the CBR service using the ATM communication lines L1 and L2, respectively. Similarly, the wavelength assignment units 102-3 and 102-4 change $\lambda 3$ and $\lambda A4$ to $\lambda 1$ and $\lambda 2$, respectively, which means that the low quality wavelengths $\lambda 1$ and $\lambda 2$ are assigned to the UBR service using the ATM communication lines L3 and L4, respectively. Then, those wavelengths are multiplexed, amplified and transmitted.

Figure 4:
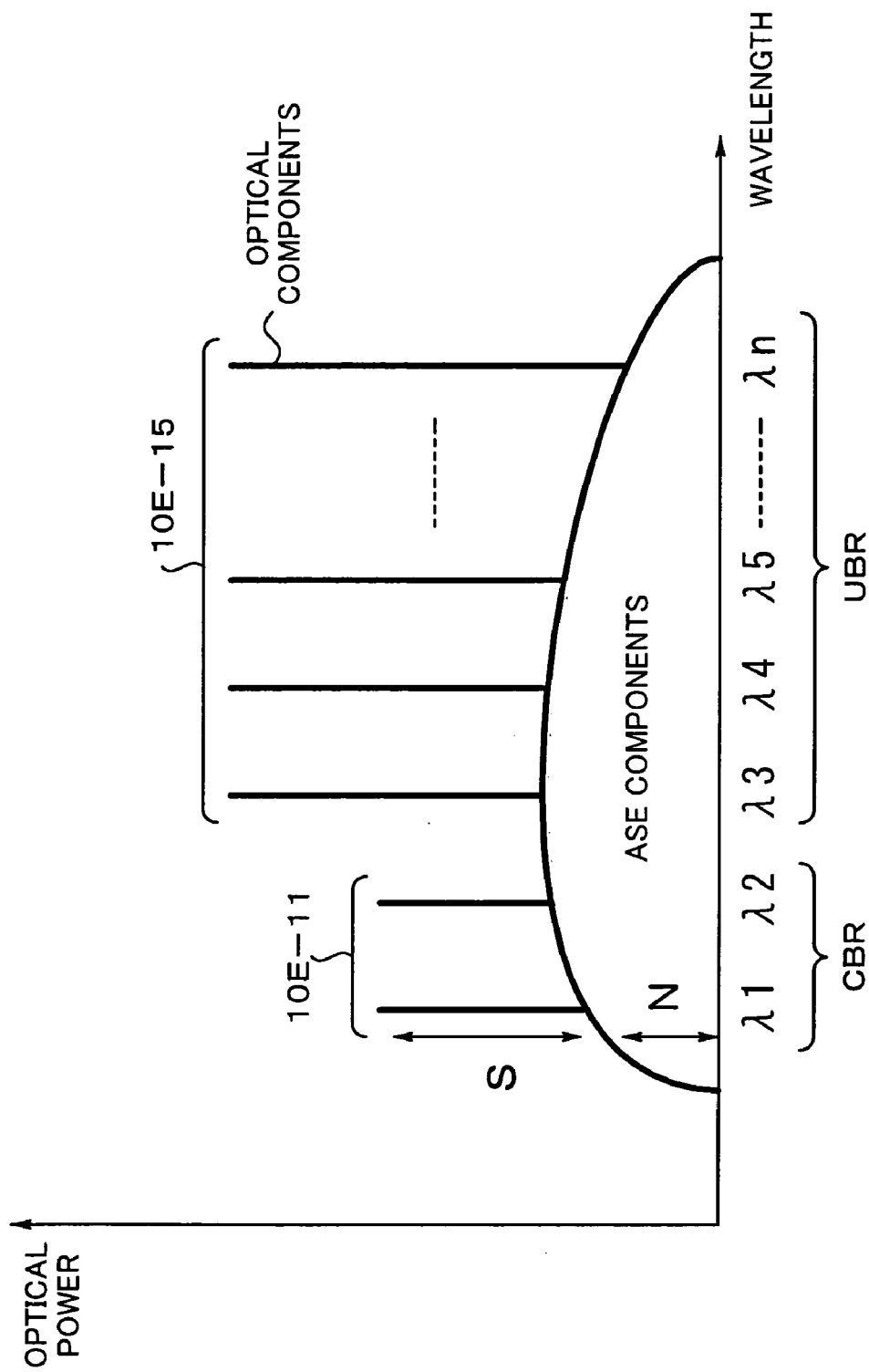
FIGS. 4 to 6 are graphs showing transmission quality of optical signals.
Figure 5:
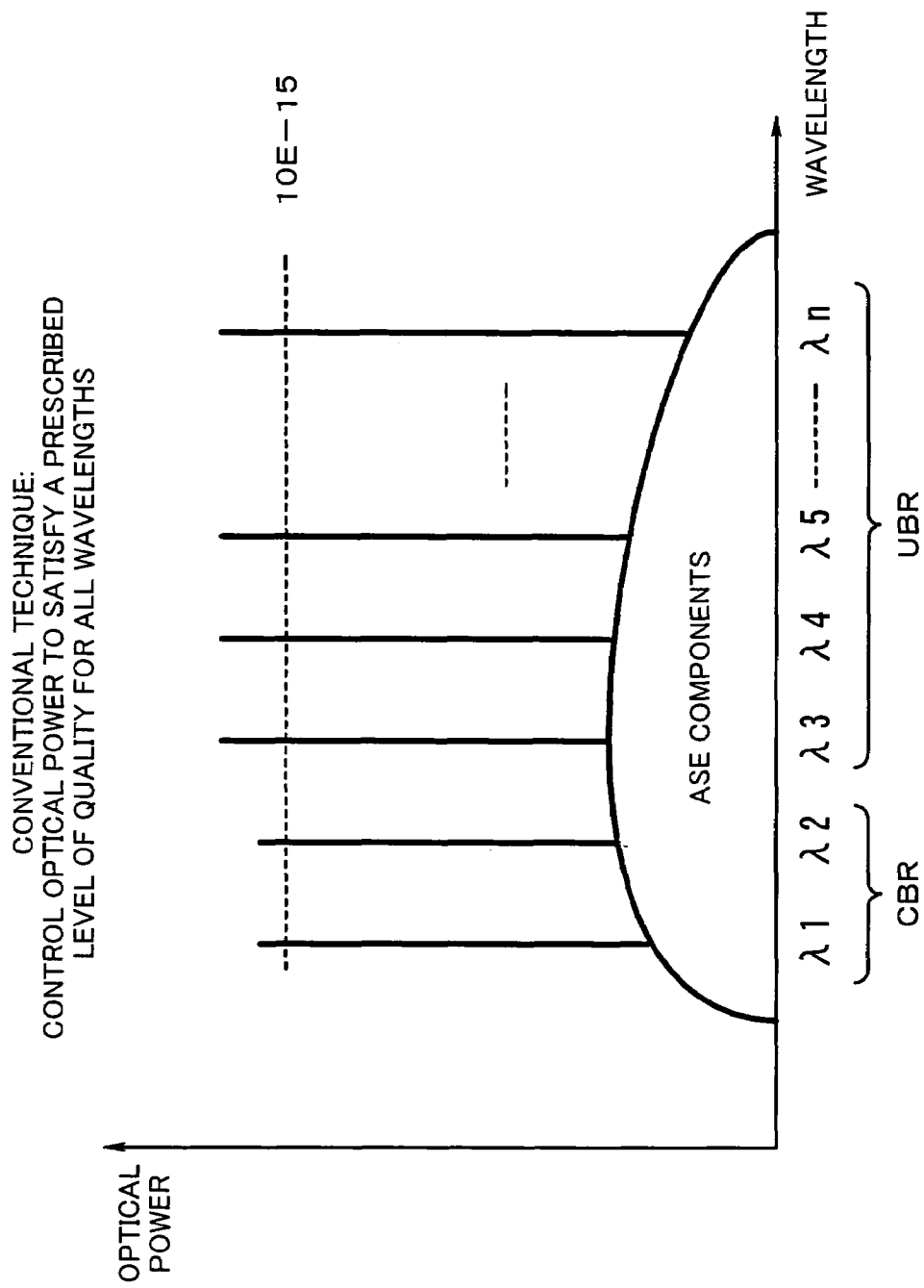
Figure 6:
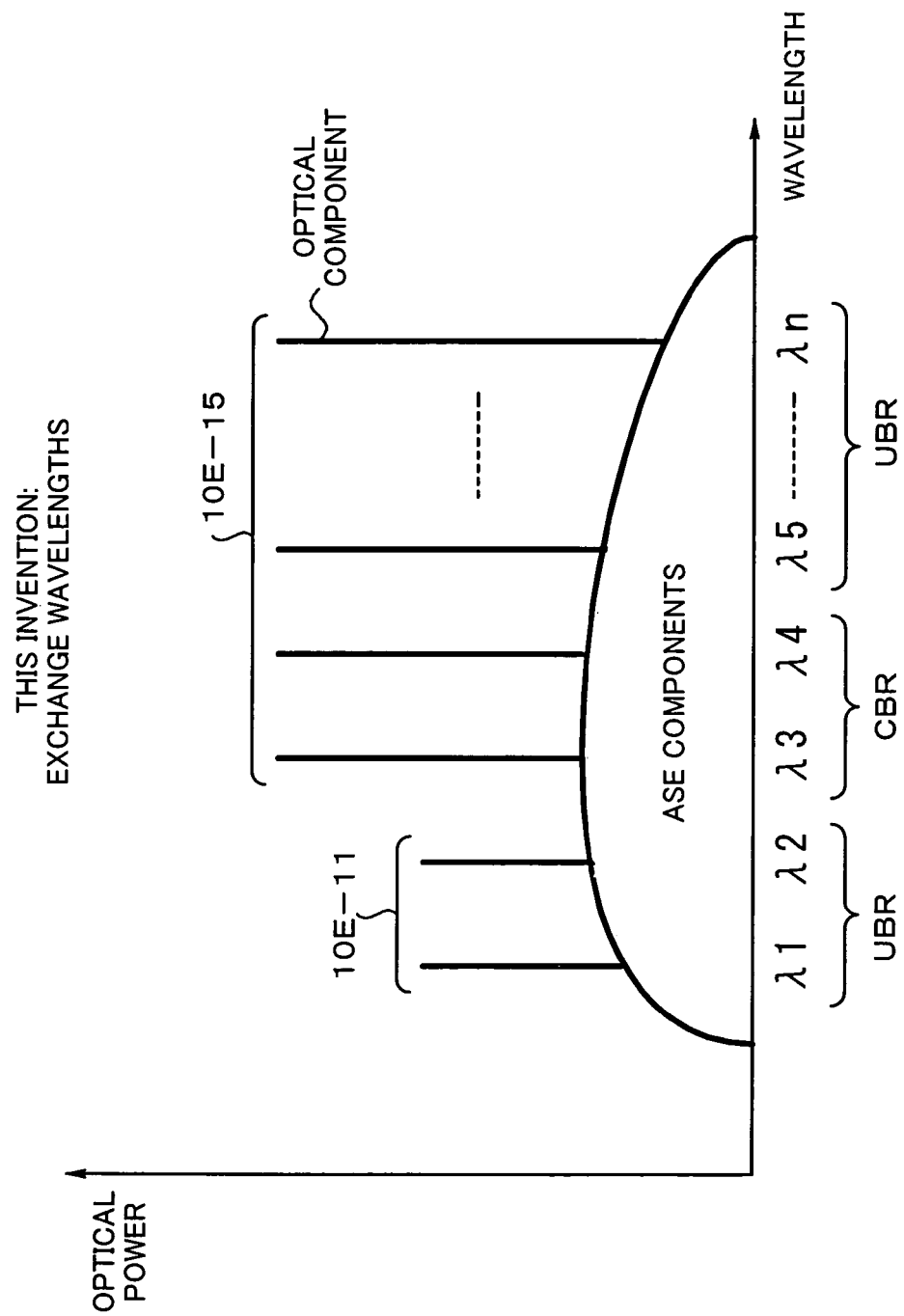

FIG. 4 to FIG. 6 are graphs showing transmission quality of optical signals, in which the vertical axis and horizontal axis represent optical power and wavelengths, respectively.

Referring first to FIG. 4 showing the initial state, the spectrum is composed of Amplified Spontaneous Emission (ASE) noise and optical signal components. As compared with $\lambda 3$ to $\lambda n$, $\lambda 1$ and $\lambda 2$ suffer greater S/N degradation. BERs of $\lambda 1$ and $\lambda 2$ are 10E-11, whereas those of $\lambda 3$ to $\lambda n$ are 10E-15.

Referring next to FIG. 5 showing the conventional case, to minimize the S/N degradation, optical pre-emphasis is applied to offer a prescribed level of signal quality for all wavelength, regardless of what connection services they are assigned to, which results in increased network costs.

Referring now to FIG. 6 showing the case of this invention, wavelengths assigned to low and high QoS communication are exchanged to perform efficient WDM transmission. That is, 10E-11 is sufficient for the UBR service. In the present example, for replacement of the low quality wavelengths $\lambda 1$ and $\lambda 2$ currently assigned for the CBR service, there are more than two high quality wavelengths for the UBR service. By exchanging, for example, $\lambda 1$ and $\lambda 3$, and $\lambda 2$ and $\lambda 4$, the WDM transmission system can fulfill the requirements without optical amplification. As a result, this invention reduces the cost of network and power consumption, thus enabling the construction of economical network.

Next, the optical power adjusting unit 104 will be described. The optical power adjusting unit 104 corresponds to the optical power control unit 13 and is optionally installed by the customer (i.e., the company operating the WDM network). More specifically, when the customer requires an End-Of-Life (EOL) guarantee of a stable transmission quality for all wavelengths, they may wish to install an optical power adjusting unit 104.

Another case is if wavelengths can not be exchanged to assign more appropriate wavelengths. For example, suppose that out of $\lambda 1$ to $\lambda 5$, $\lambda 1$ to $\lambda 3$ are used for CBR service and $\lambda 4$ and $\lambda 5$ are used for UBR service at the initial state. And suppose that the result of measuring their BERs indicates that $\lambda 1$ to $\lambda 3$ are low quality wavelengths and $\lambda 4$ and $\lambda 5$ are high quality wavelengths. Because the number of low quality wavelengths for CBR service exceeds the number of high quality wavelengths for UBR service, the wavelengths can not be exchanged. In such a case, the optical power adjusting unit 104 should be installed to adjust optical power to satisfy a prescribed level of BER. The optical power adjusting unit 104 is capable of controlling optical power by using, for example, a variable attenuator (VAT).

The optical power adjusting unit 104, which is necessarily installed in the conventional technique, is only optional in this invention as described above. Purchase and maintenance can be efficiently performed for users, resulting in the improvement of convenience.

Figure 7:
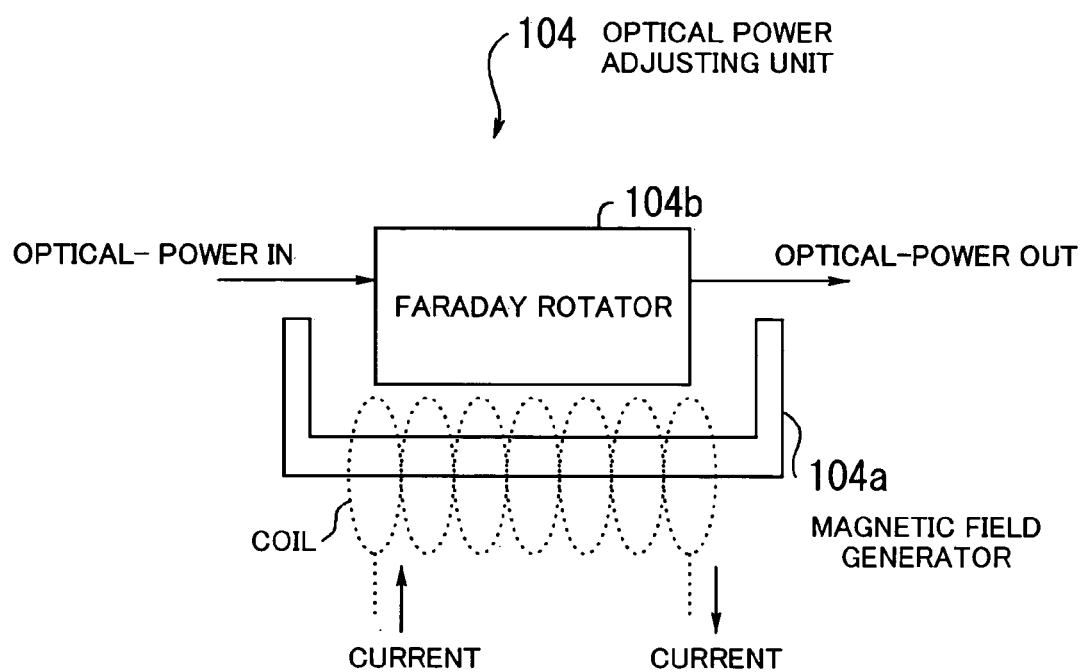
FIG. 7 is a conceptual diagram of optical power control of an optical power adjusting unit.

FIG. 7 shows a concept of optical power control by the optical power adjusting unit 104. As one example of construction, the optical power adjusting unit 104 is composed of a magnetic field generator 104a having a coil wound therearound and a Faraday rotator 104b. The magnetic field generator 104a generates a magnetic field by energizing the coil and gives it to the Faraday rotator 104b. In the Faraday rotator 104b, polarization varies due to the magnetic field. This mechanism of FIG. 7, when combined with a polarizer and analyzer (not shown), varies optical power of signals passing though the Faraday rotator 104b.

Next explanation will be made on a case of controlling the wavelength assignment by the wavelength assignment unit 11 and the exchange of wavelengths by the wavelength-assignment exchanging unit 12 by using a maintenance terminal.

Figure 8:
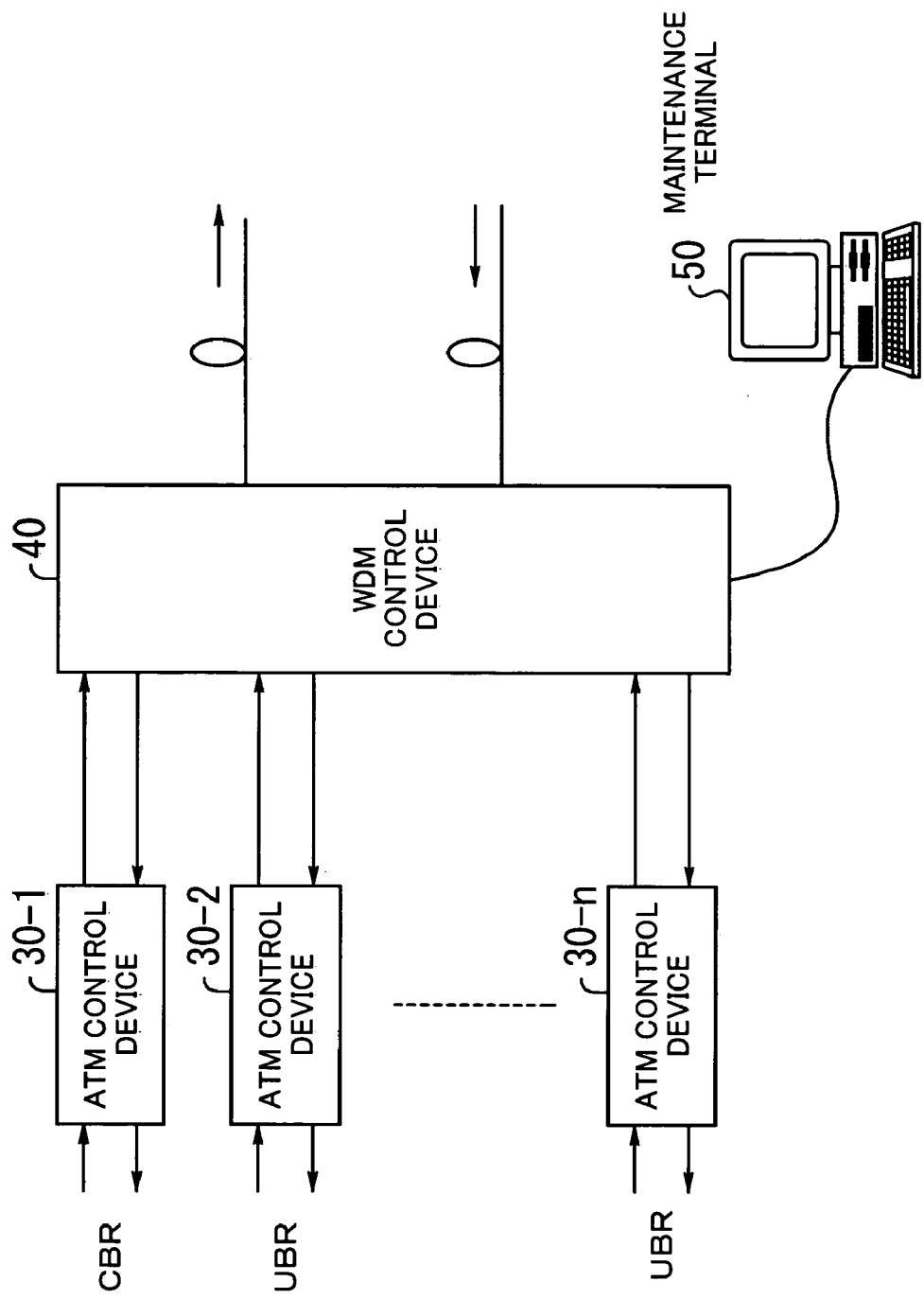
FIG. 8 shows the construction of a system at the sending end, with a maintenance terminal attached.

FIG. 8 shows the construction of a system of an optical transmission side being connected to the maintenance terminal. The WDM device 100 described with reference to FIG. 3 incorporates two functions, ATM control function and WDM control function, in an integrated way. In the system shown in FIG. 8, however, these functions are separated. ATM control devices 30-1 to 30-n are connected to the WDM control device 40, to which a maintenance terminal 50 is attached. (Alternatively, the maintenance terminal 50 may be connected to the ATM control devices 30-1 to 30-n, and the WDM control device 40 with buses).

Next, the operation will be described. The maintenance terminal 50 sets each ATM control device 30-1 to 30-n for a prescribed level of QoS via the WDM control device 40. FIG. 8 shows a situation that the ATM control devices 30-1 and 30-2 to 30-n have been set for the CBR service and the UBR service, respectively.

The WDM control device 40 changes cell data transmitted from the ATM control devices 30-1 to 30-n to optical signals having different wavelengths, and multiplexes the wavelengths to thereby transmit WDM optical signals. In addition, the WDM control device 40 extracts BER information from an OSC signal received from the WDM control device at the remote end. Then the BER information is transmitted to the maintenance terminal 50. An operator monitors the transmission quality of each wavelength on the maintenance terminal 50, and when he/she checks the BER information and wants to exchange wavelengths, he/she reconfigures the WDM control device 40 by using the maintenance terminal 50. In addition, if he/she recognizes that exchange of wavelengths can not be made, he/she installs an optical power adjusting unit to the WDM control device 40 to amplify optical power.

Such construction allows the operator to recognize the transmission quality by using the maintenance terminal 50 and to perform setting of levels of QoS and exchange of wavelengths from the outside, which means improvement of maintenance and convenience (aforementioned control can be performed in a situation where the WDM device 100 shown in FIG. 3 is connected to the maintenance terminal 50).

As described above, in the optical communication system 1 of this invention, an appropriate wavelength is selected based on QoS information and S/N information of optical signals transmitted through the WDM transmission lines, and only when wavelengths can not be exchanged or when a prescribed level of BER is required, the optical power adjusting unit such as VAT is used. Thereby, efficient WDM optical transmission can be performed with transmission quality corresponding to connection services, enabling the construction of economical network.

The foregoing description has assumed CBR and UBR services as typical connection service classes having different levels of QoS. However, the exchange of wavelengths can be flexibly performed for various connection services other than CBR and UBR.

As described above, in the optical communication system of this invention, in a case where it is recognized based on BERs that low quality wavelengths are being used for high QoS communication and when the number of low quality wavelengths for the high QoS communication does not exceed the number of high quality wavelengths for low QoS communication, the low quality wavelengths and an equal number of the high quality wavelengths are exchanged, for assignment of more appropriate wavelengths. Thereby, the WDM optical transmission can be efficiently performed with transmission quality corresponding to connection services, enabling the construction of economical network.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded a falling within the scope of the invention in the appended claims and their equivalents.

What is claimed is:

1. An optical communication system for performing Wavelength Division Multiplexing (WDM) optical communication, comprising:
   (a) an optical reception device comprising:
   Bit Error Rate (BER) measurement means for measuring BERs of individual optical signals with different wavelengths that are received from a sending end, and
   BER transmission means for transmitting BER information back to the sending end; and
   (b) an optical transmission device disposed at the sending end, comprising:
   wavelength assignment means for assigning each wavelength for optical signals to at least one of high Quality-of-Service (QoS) communication and low QoS communication,
   wavelength-assignment exchanging means for identifying, based on the BER information, wavelengths in the high QoS communication with high BERs and exchanging the identified wavelengths having the high BERs with an equal number of wavelengths having low BERs in the low QoS communication, unless the wavelengths having the high BERs in the high QoS communication outnumber the low BERs being used for the low QoS communication, and
   optical signal transmission means for multiplexing the wavelengths to transmit the optical signals.

2. The optical communication system according to claim 1, wherein said wavelength assignment means uses the high QoS communication for a bandwidth-guaranteed connection service and uses the low QoS communication for a best-effort correction service.

3. The optical communication system according to claim 1, further comprising optical power control means for amplifying optical power of the low quality wavelengths or all wavelengths in a case where wavelengths cannot be exchanged to assign more appropriate wavelengths or where BERs are desired to satisfy a prescribed level.

4. The optical communication system according to claim 3, wherein said optical power control means is provided as a field installable option.

5. The optical communication system according to claim 1, wherein wavelength assignment by said wavelength assignment means and exchange of wavelengths by said wavelength-assignment exchanging means are controlled from a maintenance terminal.

6. An optical transmission device for trying Wavelength Division Multiplexing (WDM) optical signals, comprising:
   wavelength assignment means for assigning each wavelength for optical signals to at least one of high Quality-of-Service (QoS) communication and low QoS communication;
   wavelength-assignment exchanging means for identifying, based on Bit Error Rate (BER) information, wavelengths in the high QoS communication having high BERs and exchanging the identified wavelengths having the high BERs with an equal number of wavelengths having lows BERs in the low QoS communication, unless the wavelengths having the high BERs in the high QoS communication outnumber the low BERs being used for the low QoS communication; and optical signal transmission means for multiplexing the wavelengths to transmit optical signals.

7. The optical transmission device according to claim 6, wherein said wavelength assignment means uses the high QoS communication for a bandwidth-guaranteed connection service and uses the low QoS communication for a best-effort connection service.

8. The optical transmission device according to claim 6, further comprising optical power control means for amplifying optical power of the low quality wavelengths or all wavelengths in a case where wavelengths cannot be exchanged or where BERs are desired to satisfy a prescribed level.

9. The optical transmission device according to claim 8, wherein said optical power control means is provided as a field-installable option.

10. The optical transmission device according to claim 6, wherein wavelength assignment by the wavelength assignment means and exchange of wavelengths by the wavelength-assignment exchanging means are controlled from a maintenance terminal.

* * * * *